(12) United States Patent
Fassnacht et al.

(10) Patent No.: US 9,577,441 B2
(45) Date of Patent: Feb. 21, 2017

(54) METHOD FOR CHARGING THE ENERGY STORAGE CELLS OF AN ENERGY STORAGE DEVICE, AND RECHARGEABLE ENERGY STORAGE DEVICE

(71) Applicant: Robert Bosch GmbH, Stuttgart (DE)

(72) Inventors: Jochen Fassnacht, Calw (DE); Martin Kessler, Schwaebisch Gmuend (DE); Erik Weissenborn, Stuttgart (DE); Peter Feuerstack, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 204 days.

(21) Appl. No.: 14/395,613

(22) PCT Filed: Mar. 25, 2013

(86) PCT No.: PCT/EP2013/056198
§ 371 (c)(1),
(2) Date: Oct. 20, 2014

(87) PCT Pub. No.: WO2013/160041
PCT Pub. Date: Oct. 31, 2013

(65) Prior Publication Data
US 2015/0130420 A1 May 14, 2015

(30) Foreign Application Priority Data

Apr. 23, 2012 (DE) .......................... 10 2012 206 622

(51) Int. Cl.
*H01M 10/44* (2006.01)
*H01M 10/46* (2006.01)
(Continued)

(52) U.S. Cl.
CPC .............. *H02J 7/0013* (2013.01); *B60L 8/003* (2013.01); *B60L 11/126* (2013.01);
(Continued)

(58) Field of Classification Search
CPC ...... H02J 7/0013; H02J 7/0014; H02J 7/0016; H02J 7/1423
(Continued)

(56) References Cited

U.S. PATENT DOCUMENTS

| | | | |
|---|---|---|---|
| 8,288,992 B2 * | 10/2012 | Kramer | ................ H02J 7/0016 320/117 |
| 2004/0135545 A1 | 7/2004 | Fowler et al. | |
| 2015/0044520 A1 * | 2/2015 | Feuerstack | ........ H01M 10/0525 429/50 |

FOREIGN PATENT DOCUMENTS

| | | |
|---|---|---|
| CN | 102007666 A | 4/2011 |
| DE | 102009014386 | 9/2010 |

(Continued)

OTHER PUBLICATIONS

International Search Report for Application No. PCT/EP2013/056198 dated Jun. 17, 2013 (English Translation, 2 pages).

*Primary Examiner* — Edward Tso
(74) *Attorney, Agent, or Firm* — Michael Best & Friedrich LLP

(57) ABSTRACT

The invention relates to a method for charging energy storage cells of an energy storage device with a plurality of energy storage modules which are connected in series in an energy supply line, each energy storage module comprising an energy storage cell module which has at least one energy storage cell and comprising a coupling device with coupling elements. The coupling elements are designed to selectively connect the energy storage cell module in the energy supply line or to bridge the energy storage cell module. The method consists of the following steps: coupling the output connections of the energy storage device to a DC voltage source, controlling the coupling devices of all the energy storage modules in order to bridge the energy storage cell modules in the energy supply line for a first specified period of time,
(Continued)

and controlling the coupling devices of at least one first energy storage module in order to connect the energy storage cell module of the first energy storage module in the energy supply line for a second specified period of time after the first specified period of time has elapsed.

14 Claims, 2 Drawing Sheets

(51) Int. Cl.
  *H02J 7/00* (2006.01)
  *B60L 8/00* (2006.01)
  *B60L 11/12* (2006.01)
  *B60L 11/18* (2006.01)
(52) U.S. Cl.
  CPC ....... *B60L 11/1803* (2013.01); *B60L 11/1816* (2013.01); *B60L 11/1853* (2013.01); *B60L 11/1864* (2013.01); *B60L 11/1868* (2013.01); *H02J 7/0016* (2013.01); *B60L 2240/80* (2013.01); *Y02T 10/6217* (2013.01); *Y02T 10/7005* (2013.01); *Y02T 10/7011* (2013.01); *Y02T 10/7055* (2013.01); *Y02T 10/7061* (2013.01); *Y02T 10/7066* (2013.01); *Y02T 10/7072* (2013.01); *Y02T 10/7077* (2013.01); *Y02T 10/7083* (2013.01); *Y02T 10/7094* (2013.01); *Y02T 90/14* (2013.01)

(58) Field of Classification Search
  USPC ................................ 320/116, 118, 119, 122
  See application file for complete search history.

(56) References Cited

FOREIGN PATENT DOCUMENTS

| | | |
|---|---|---|
| DE | 102009046501 | 5/2011 |
| DE | 102009054818 | 6/2011 |
| DE | 102010027857 | 10/2011 |
| DE | 102010027861 | 10/2011 |

\* cited by examiner

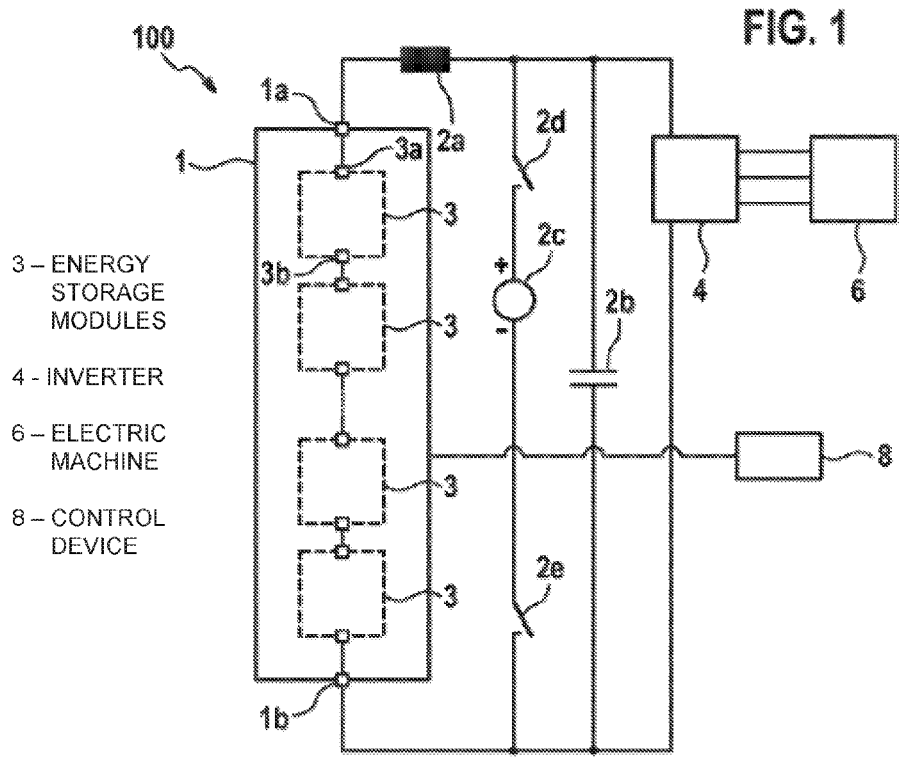
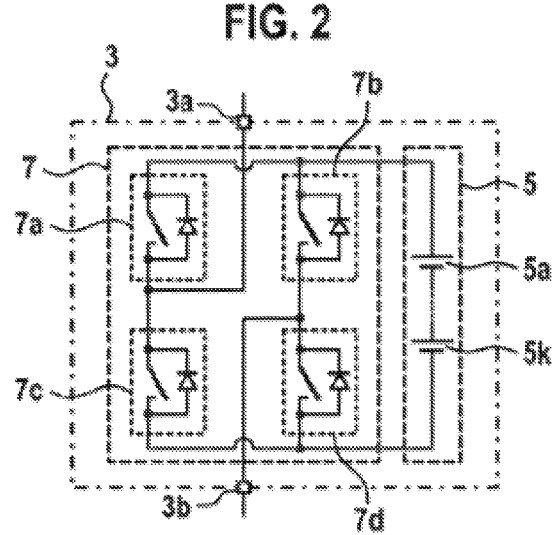
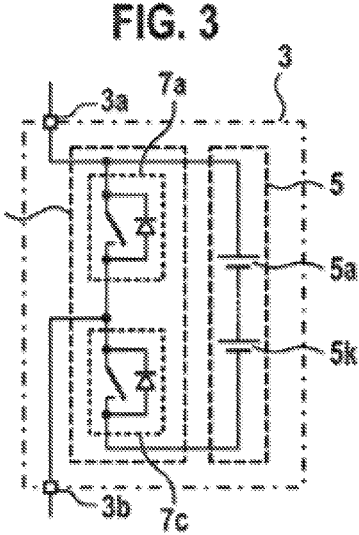

METHOD FOR CHARGING THE ENERGY STORAGE CELLS OF AN ENERGY STORAGE DEVICE, AND RECHARGEABLE ENERGY STORAGE DEVICE

BACKGROUND OF THE INVENTION

The invention relates to a method for charging energy storage cells of an energy storage device and to a rechargeable energy storage device, in particular an energy storage device comprising a modular battery system for an electrically operated vehicle.

It is becoming apparent, that, in the future, increasingly electronic systems which combine new energy storage technologies with electric drive technology will be used both in stationary applications, such as wind turbines or solar systems, for example, and in vehicles, such as hybrid or electric vehicles.

The feed of polyphase current into an electric machine is conventionally effected by a converter in the form of a pulse-controlled inverter. For this purpose, a DC voltage provided by a DC link can be converted into a polyphase AC voltage, for example, a three-phase AC voltage. The DC link is in this case fed from a string of series-connected battery modules. In order to be able to meet the requirements set for a specific application in respect of power and energy, often a plurality of battery modules are connected in series in a traction battery.

The documents DE 10 2010 027 857 A1 and DE 10 2010 027 861 A1 disclose battery cells which are interconnected in modular fashion in energy storage devices, which battery cells can be coupled or decoupled selectively into or from the string comprising series-connected battery cells via suitable actuation of coupling units. Systems of this type are known by the term battery direct converter (BDC). Such systems include DC sources in an energy storage module string which are connectable to a DC link for the supply of electrical energy to an electric machine or to an electric grid via a pulse-controlled inverter.

The energy storage module string in this case has a plurality of energy storage modules connected in series, wherein each energy storage module has at least one battery cell and an associated controllable coupling unit, which makes it possible to bypass the respectively assigned at least one battery cell or to switch the respectively assigned at least one battery cell into the respective energy storage module string, depending on control signals. Optionally, the coupling unit can be configured such that it additionally makes it possible to switch the respectively assigned at least one battery cell into the respective energy storage module string even with inverse polarity or else to interrupt the respective energy storage module string.

BDCs generally have greater efficiency and greater failsafety than conventional systems. The failsafety is ensured, inter alia, by virtue of the fact that battery cells that are defective, have failed or are not fully functional can be disconnected from the energy supply string by suitable bypass actuation of the coupling units. The total output voltage of the energy storage module string can be varied and in particular adjusted stepwise by corresponding actuation of the coupling units. The stepping of the output voltage in this case results from the voltage of a single energy storage module, wherein the maximum possible total output voltage is determined by the sum of the voltages of all energy storage modules of the energy storage module string.

In order to adjust an output voltage of an energy storage module, pulse-width-modulated (PWM) actuation of the coupling units can take place. It is thus possible to output a desired average value as energy storage module voltage by targeted variation of the switch-on or switch-off times.

For BDCs, it is necessary to develop charging strategies with which the battery cells of the energy storage modules can be recharged simply, efficiently and flexibly.

SUMMARY OF THE INVENTION

The present invention, in accordance with one aspect, provides a method for charging energy storage cells of an energy storage device comprising a multiplicity of energy storage modules connected in series in an energy supply string, which energy storage modules each comprise an energy storage cell module, which has at least one energy storage cell, and a coupling device comprising coupling elements, which are configured to selectively switch the energy storage cell module into the energy supply string or to bypass said energy storage cell module. In this case, the method has the steps of coupling the output connections of the energy storage device to a DC voltage source, actuating the coupling devices of all energy storage modules for bypassing the energy storage cell modules in the energy supply string for a first predetermined time span, and actuating the coupling devices of at least one first energy storage module for switching the energy storage cell module of the first energy storage module into the energy supply string for a second predetermined time span once the first predetermined time span has elapsed.

In accordance with a further aspect, the present invention provides a system, comprising an energy storage device comprising a multiplicity of energy storage modules connected in series in an energy supply string, which energy storage modules each comprise an energy storage cell module, which has at least one energy storage cell, and a coupling device comprising coupling elements, which are configured to selectively switch the energy storage cell module into the energy supply string or to bypass said energy storage cell module. The system furthermore has a DC link, which is coupled to output connections of the energy storage device, a pulse-controlled inverter, which is coupled to the DC link and which is fed an input voltage from the DC link, an electric machine, which is coupled to the pulse-controlled inverter and which is supplied a phase voltage by the pulse-controlled inverter, a DC voltage source, which is connected switchably to the output connections of the energy storage device, and a control device, which is coupled to the coupling devices and which is configured to selectively actuate the coupling devices of the energy storage device for providing a total output voltage of the energy storage device and to implement a method in accordance with the invention.

One concept of the present invention consists in charging an energy storage device with a modular design comprising battery cells which are connected in series in an energy supply string via a DC voltage source. In this case, components already used in the energy storage device are used to charge the energy storage cells of the energy storage device by virtue of a high-frequency change between charging current withdrawal from the DC voltage source and transfer of the buffer-stored charging current to one or more of the energy storage modules. The coupling devices of the energy storage modules in this case, together with a storage inductor or parasitic inductances of the energy storage cells modules, implement a step-up converter function for the DC voltage source, with the result that said DC voltage source appears as an adjustable constant current source for the energy storage cells.

This has the advantage that the energy storage device can be charged without any additional components, which considerably improves installation space, weight and efficiency of the energy storage device. Furthermore, different energy storage modules can be charged flexibly, as result of which differences in charge between the energy storage cell modules can be compensated for.

In addition, there is the advantage that the charging current can be adjusted independently of the DC voltage of the DC voltage source. As a result, different DC voltage sources can be used as charging source. In particular, DC voltage sources with a higher DC voltage than the maximum module voltage of the energy storage modules can also be used.

Finally, the switching losses during charging operation can be minimized by virtue of the parasitic inductances of the energy storage cell modules being included in the charging strategy.

In accordance with one embodiment of the method according to the invention, the step of coupling comprises coupling one of the output connections of the energy storage device to the DC voltage source via a coupling inductance, and the duration of the second predetermined time span is dependent on an absolute value of the current through the coupling inductance. In this way, firstly the charging voltage of the DC voltage source can be stepped up and secondly current fluctuations in the charging current can be smoothed via the coupling inductance as energy buffer store.

Alternatively, the duration of the second predetermined time span can be dependent on an absolute value of the current flow through the energy storage cell module of the first energy storage module. As a result, the parasitic inductances of the energy storage cell modules can be utilized to realize the step-up converter function.

In accordance with a further embodiment of the method according to the invention, the steps of bypassing the energy storage cell modules and switching at least one energy storage cell module into the energy supply string can be iterated.

In accordance with a further embodiment of the method according to the invention, in an iteration step, actuation of the coupling devices of at least one second energy storage module for switching the energy storage cell module of the second energy storage module into the energy supply string can take place.

In accordance with one embodiment of the system according to the invention, the coupling devices can comprise coupling elements in a full-bridge circuit. Alternatively, the coupling devices can comprise coupling elements in a half-bridge circuit.

In accordance with a further embodiment of the system according to the invention, the energy storage cells can comprise lithium-ion rechargeable batteries.

In accordance with a further embodiment of the system according to the invention, the system can furthermore comprise a coupling inductance, which is coupled between one of the output connections of the energy storage device and the DC voltage source.

In accordance with a further embodiment of the system according to the invention, the DC voltage source can be a solar cell, a range extender, a low-voltage battery or a two-quadrant current source. With these possibilities, the system can be charged very flexibly. In addition, energy sources already existing in the system can be used for charging the energy storage device.

BRIEF DESCRIPTION OF THE DRAWINGS

Further features and advantages of embodiments of the invention result from the description below with reference to the attached drawings.

In the drawings:

FIG. 1 shows a schematic illustration of a system comprising an energy storage device in accordance with one embodiment of the present invention;

FIG. 2 shows a schematic illustration of an exemplary embodiment of an energy storage module of an energy storage device shown in FIG. 1;

FIG. 3 shows a schematic illustration of a further exemplary embodiment of an energy storage module of an energy storage device as shown in FIG. 1.

DETAILED DESCRIPTION

Figure 4:
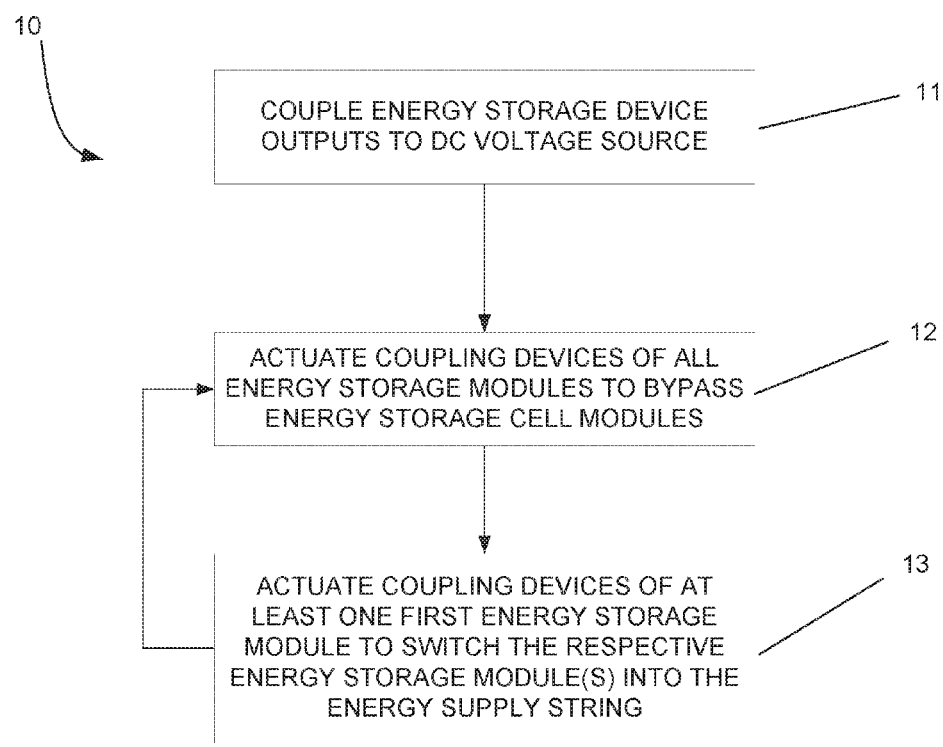
FIG. 4 shows a schematic illustration of a method for charging energy storage cells of an energy storage device in a system in accordance with a further embodiment of the present invention.

FIG. 1 shows a system 100 for voltage conversion from DC voltage provided by energy storage modules 3 into an n-phase AC voltage. The system 100 comprises an energy storage device 1 comprising energy storage modules 3, which are connected in series in an energy supply string. The energy supply string is coupled between two output connections 1a and 1b of the energy storage device 1, which output connections are each coupled to a DC link 2b. By way of example, the system 100 in FIG. 1 is used for feeding a three-phase electric machine 6. However, provision can also be made for the energy storage device 1 to be used for generating electric current for an energy supply grid 6.

For this purpose, the energy storage device 1 is coupled to the DC link 2b via a coupling inductance 2a. The coupling inductance 2a can be, for example, an inductive inductor which is connected in a targeted manner between the DC link 2b and the output connection 1a of the energy storage device 1. Alternatively, it may also be possible for the coupling inductance 2a to be formed by parasitic inductances which are present in any case in the interconnection between the energy storage device 1 and the DC link 2b.

The DC link 2b feeds a pulse-controlled inverter 4, which provides a three-phase AC voltage for the electric machine 6 from the DC voltage of the DC link 2b.

The system 100 can furthermore comprise a control device 8, which is connected to the energy storage device 1 and with the aid of which the energy storage device 1 can be controlled so as to provide the desired total output voltage of the energy storage device 1 at the respective output connections 1a, 1b. In addition, the control device 8 can be configured to actuate the respective coupling elements or active switching elements of the energy storage device 1 during charging of the energy storage cells of the energy storage device 1.

A DC voltage source 2c can be connected or optionally connectable to the output connections 1a, 1b of the energy storage device 1. For example, the DC voltage source 2c can be connected selectively in parallel with the DC link 2b via disconnecting contactors 2d, 2e. The DC voltage source 2c can be, for example, a solar cell, a range extender of a hybrid vehicle, a low-voltage battery, for example a vehicle electrical distribution system, or a two-quadrant current source. The disconnecting contactors 2d, 2e can also be actuated via the control device 8.

The energy supply string of the energy storage device 1 has at least two energy storage modules 3 connected in series. By way of example, the number of energy storage modules 3 in FIG. 1 is four, but any other number of energy storage modules 3 is likewise possible. The energy storage modules 3 each have two output connections 3a and 3b, via which a module output voltage of the energy storage modules 3 can be provided. Since the energy storage modules 3 are primarily connected in series, the module output voltages of the energy storage modules 3 add up to give the total output voltage which is provided at the output connections 1a, 1b of the energy storage device 1.

Two exemplary designs of the energy storage modules 3 are shown in greater detail in FIG. 2 and FIG. 3. The energy storage modules 3 in this case each comprise a coupling device 7 having a plurality of coupling elements 7a, 7c and 7b and 7d. The energy storage modules 3 furthermore each comprise an energy storage cell module 5 comprising one or more energy storage cells 5a to 5k connected in series.

The energy storage cell module 5 can in this case have, for example, cells 5a to 5k, for example lithium-ion cells or lithium-ion rechargeable batteries, which are connected in series. In this case, the number of energy storage cells 5a to 5k in the energy storage modules 3 shown in FIG. 2 and FIG. 3 is two, by way of example, but any other number of energy storage cells 5a to 5k is likewise possible. The energy storage cell modules 5 have a terminal voltage of $U_M$ and are connected to input connections of the associated coupling device 7 via connecting lines. That is to say that the voltage $U_M$ is present at the input terminals of the associated coupling device 7.

In FIG. 2, the coupling elements 7a and 7c which are connected in series and whose center tap is connected to the output terminal 3a form the so-called left-hand branch of the full bridge, and the coupling elements 7b and 7d which are connected in series and whose center tap is connected to the output terminal 3b form the so-called right-hand branch of the full bridge. The coupling device 7 is in the form of a full-bridge circuit comprising in each case two coupling elements 7a, 7c and two coupling elements 7b, 7d in FIG. 2. The coupling elements 7a, 7b, 7c, 7d can in this case each have an active switching element, for example a semiconductor switch, and a freewheeling diode connected in parallel therewith. In this case, provision may be made for the coupling elements 7a, 7b, 7c, 7d to be in the form of MOSFET switches, which already have an intrinsic diode.

The coupling elements 7a, 7b, 7c, 7d can be actuated, for example with the aid of the control device 9 illustrated in FIG. 1, in such a way that the respective energy storage cell module 5 is switched selectively between the output connections 3a and 3b or that the energy storage cell module 5 is bypassed. With reference to FIG. 2, the energy storage cell module 5 can be switched between the output connections 3a and 3b in the forwards direction, for example, by virtue of the active switching element of the coupling element 7d and the active switching element of the coupling element 7a being set to a closed state, while the two remaining active switching elements of the coupling elements 7b and 7c are set to an open state. In this case, the voltage $U_M$ is present between the output terminals 3a and 3b of the coupling device 7. A bypass state can be set, for example, by virtue of the fact that the two active switching elements of the coupling elements 7a and 7b are set to the closed state, while the two active switching elements of the coupling elements 7c and 7d are held in the open state. A second bypass state can be set, for example, by virtue of the fact that the two active switches of the coupling elements 7c and 7d are set to the closed state, while the active switching elements of the coupling elements 7a and 7b are held in the open state. In both bypass states, the voltage 0 is present between the two output terminals 3a and 3b of the coupling device 7. Likewise, the energy storage cell module 5 can be switched between the output connections 3a and 3b of the coupling device 7 in the reverse direction by virtue of the active switching elements of the coupling elements 7b and 7c being set to the closed state, while the active switching elements of the coupling elements 7a and 7d are set to the open state. In this case, the voltage $-U_M$ is present between the two output terminals 3a and 3b of the coupling device 7.

By virtue of suitable actuation of the coupling devices 7, therefore, individual energy storage cell modules 5 of the energy storage modules 3 can be integrated in a targeted manner in the series circuit of the energy supply string. As a result, by virtue of targeted actuation of the coupling devices 7 for selective switching of the energy storage cell modules 5 of the energy storage modules 3 in the energy supply string, a total output voltage can be provided which is dependent on the individual output voltages of the energy storage cell modules 5 of the energy storage modules 3. The total output voltage can in this case be set in each case stepwise, wherein the number of steps scales with the number of energy storage modules 3. In the case of a number of n energy storage modules 3, the total output voltage of the energy supply string can be set in 2n+1 steps between $-n \cdot U_M, \ldots, 0, \ldots, +n \cdot U_M$.

FIG. 3 shows a schematic illustration of a further exemplary configuration of an energy storage module 3. In this case, the coupling device 7 comprises only the coupling elements 7a and 7c, which, as a half-bridge circuit, can switch the energy storage cell module 5 either to a bypass state or a switching state in the forward direction into the energy supply string. Moreover, similar actuation rules apply as explained in connection with FIG. 3 for the energy storage module 3 shown in said figure with a full-bridge circuit.

FIG. 4 shows a schematic illustration of a method 10 for charging energy storage cells of an energy storage device, for example of energy storage cells 5a to 5k of the energy storage device 1 in FIG. 1. The method 10 is particularly suitable for use in electrically operated vehicles, which have an electric motor as electric machine 6. In such vehicles, a DC voltage source 2c can already be provided, for example a range extender or a low-voltage battery. However, it is also possible to couple the DC voltage source 2c to the system 100 exclusively for the charging operation.

The method 10 can comprise, as first step 11, connection or coupling of the output connections 1a, 1b of the energy storage device 1 to the DC voltage source 2c. For example, the connection can be performed in this case via an inductive component 2a, such as, for example, a storage inductor or coupling inductance 2a. In this case, the storage inductor 2a and the DC voltage source 2c interact as a step-up converter, so that the charging voltage which can be provided to an energy storage module 3 in the energy supply string can be increased by stepping up the voltage provided in the DC voltage source 2c in the storage inductor 2a. The inductive component 2a can generally be a coupling inductance 2a, which is also present, for example, as parasitic inductance at the output of the energy storage device 1. It may also be possible for a total inductance of the system to comprise locally distributed inductive components in the energy supply string and the lines of the energy storage device 1. For the coupling of the DC voltage source 2c, the control device 8 can actuate the disconnecting contactors 2d, 2e so as to close them, for example.

For buffer-storing electrical energy in the DC link 2b, in a step 12 actuation of the coupling devices 7 of all of the energy storage modules 3 for bypassing the energy storage cell modules 5 in the energy supply string for a first predetermined time span can take place in a coupling inductance 2a or the parasitic inductances of the energy storage device 1. As a result, electrical energy is drawn from the DC voltage source 2c and impressed in the coupling inductance 2a as current.

It may be possible in this case for the DC voltage source 2c to be used in a mixed charging and supply operating mode, so that some of the electrical energy is used for supplying the pulse-controlled inverter 4 via the DC link 2b. It may furthermore be possible for not all of the energy storage modules 3 to be bypassed in order to allow back-emfs in the current path of the energy storage device 1.

The buffer-stored energy can then be transmitted to at least one first energy storage module 3 of the energy supply string. For this purpose, in a third step 13, actuation of the coupling devices 7 of the at least one first energy storage module 3 for switching the respective energy storage cell modules 5 into the energy supply string for a second predetermined time span can take place once the first predetermined time span has elapsed. The current flowing through the coupling inductance 2a is driven further and thus charges the first energy storage modules 3. In this case, it is possible to only ever charge one energy storage module 3 or to charge a plurality of energy storage modules 3 simultaneously. An energy storage module 3 can also be charged with the described procedure if the DC voltage of the DC voltage source 2c is lower than the module voltage of the energy storage module 3 to be charged. Thus, energy storage devices 1 of different sizes and with different designs can be charged with a constant, in particular standardized DC voltage.

If the current from the coupling inductance 2a or the parasitic inductances falls below a predetermined limit value, the second time span can end.

Depending on the DC voltage, the module voltages, the coupling inductance 2a and the desired charging current, the time periods of the first and second time spans can be adapted correspondingly. The steps of bypassing and connecting the energy storage modules 3 can be iterated, wherein, in different iteration steps, different energy storage modules 3 can be selected for the charging operation, for example depending on the state of charge, on the loading and/or on the heat generation.

The invention claimed is:

1. A method (10) for charging energy storage cells (5a, 5k) of an energy storage device (1) comprising a multiplicity of energy storage modules (3) connected in series in an energy supply string, each of the multiplicity of energy storage modules (3) comprising:
an energy storage cell module (5), which has at least one energy storage cell (5a, 5k), and
a coupling device (7) comprising coupling elements (7a, 7b; 7c, 7d), which are configured to selectively switch the energy storage cell module (5) into the energy supply string or to bypass said energy storage cell module,
wherein the method (10) has the following steps:
coupling (11) output connections (1a, 1b) of the energy storage device (1) to a DC voltage source (2c);
actuating (12) the coupling devices (7) of all of the multiplicity of energy storage modules (3) for bypassing the energy storage cell modules (5) in the energy supply string for a first predetermined time span, as a result of which electrical energy is drawn from the DC voltage source (2c) and impressed as current into a coupling inductance (2a) or the parasitic inductances of the energy storage device (1), as a result of which electrical energy is buffer stored in a DC link (2b); and
actuating (13) the coupling devices (7) of at least one first energy storage module (3) for switching the energy storage cell module (5) of the at least one first energy storage module (3) into the energy supply string for a second predetermined time span once the first predetermined time span has elapsed.

2. The method (10) as claimed in claim 1, wherein the coupling step (11) comprises coupling of one of the output connections (1a, 1b) of the energy storage device (1) to the DC voltage source (2c) via the coupling inductance (2a), and wherein the duration of the second predetermined time span is dependent on an absolute value of a current through the coupling inductance (2a).

3. The method (10) as claimed in claim 1, wherein the duration of the second predetermined time span is dependent on an absolute value of the current flow through the energy storage cell module (5) of the first energy storage module (3).

4. The method (10) as claimed in claim 1, wherein the steps of bypassing the energy storage cell modules (5) and switching at least one energy storage cell module (5) into the energy supply string are iterated.

5. The method (10) as claimed in claim 4, further comprising actuation (13) of the coupling devices (7) of at least one second energy storage module (3) for switching the energy storage cell module (5) of the at least one second energy storage module (3) into the energy supply string.

6. A system (100), comprising:
an energy storage device (1) comprising a multiplicity of energy storage modules (3) connected in series in an energy supply string, which energy storage modules each comprise:
an energy storage cell module (5), which has at least one energy storage cell (5a, 5k), and
a coupling device (7) comprising coupling elements (7a, 7b; 7c, 7d), which are configured to selectively switch the energy storage cell module (5) into the energy supply string or to bypass said energy storage cell module;
a DC link (2b), which is coupled to output connections (1a, 1b) of the energy storage device (1);
a pulse-controlled inverter (4), which is coupled to the DC link (2b) and which is fed an input voltage from the DC link (2b);
an electric machine (6), which is coupled to the pulse-controlled inverter (4) and which is supplied a phase voltage by the pulse-controlled inverter (4);
a DC voltage source (2c), which is connected switchably to the output connections (1a, 1b) of the energy storage device (1); and
a control device (8), which is coupled to the coupling devices (7) and which is configured to selectively actuate the coupling devices (7) of the energy storage device (1) for providing a total output voltage of the energy storage device (1) and to implement a method (10) as claimed in claim 1.

7. The system (100) as claimed in claim 6, wherein the coupling devices (7) comprise coupling elements (7*a*; 7*b*; 7*c*; 7*d*) in a full-bridge circuit.

8. The system (100) as claimed in claim 6, wherein the coupling devices (7) comprise coupling elements (7*a*; 7*c*) in a half-bridge circuit.

9. The system (100) as claimed in claim 6, wherein the energy storage cells (5*a*, 5*k*) comprise lithium-ion rechargeable batteries.

10. The system (100) as claimed in claim 6, further comprising:
   a coupling inductance (2*a*), which is coupled between one of the output connections (1*a*) of the energy storage device (1) and the DC voltage source (2*c*).

11. The system (100) as claimed in claim 6, wherein the DC voltage source (2*c*) is a solar cell.

12. The system (100) as claimed in claim 6, wherein the DC voltage source (2*c*) is a range extender.

13. The system (100) as claimed in claim 6, wherein the DC voltage source (2*c*) is a low-voltage battery.

14. The system (100) as claimed in claim 6, wherein the DC voltage source (2*c*) is a two-quadrant current source.

\* \* \* \* \*